(12) United States Patent
Behruzi et al.

(10) Patent No.: US 7,621,291 B2
(45) Date of Patent: Nov. 24, 2009

(54) FUEL TANK WITH SPECIALIZED TANK OUTLET FOR SPACECRAFT

(75) Inventors: Kei Philipp Behruzi, Bremen (DE); Mark Michaelis, Bremen (DE)

(73) Assignee: EADS Space Transportation GmbH, Bremen (DE)

( * ) Notice: Subject to any disclaimer, the term of this patent is extended or adjusted under 35 U.S.C. 154(b) by 391 days.

(21) Appl. No.: 11/641,182

(22) Filed: Dec. 18, 2006

(65) Prior Publication Data

US 2007/0145194 A1   Jun. 28, 2007

(30) Foreign Application Priority Data

Dec. 22, 2005   (DE) .................. 10 2005 062 092

(51) Int. Cl.
*B67D 5/54* (2006.01)
(52) U.S. Cl. .................. 137/154; 137/590; 244/172.2; 244/172.3
(58) Field of Classification Search .................. 137/140, 137/154, 171, 177, 590, 592; 244/172.3, 244/172.2, 135 R, 158 R; 96/187, 204, 206; 95/260; 55/413
See application file for complete search history.

(56) References Cited

U.S. PATENT DOCUMENTS

| | | | | |
|---|---|---|---|---|
| 2,107,390 A | * | 2/1938 | Rosmait | 366/136 |
| 2,163,988 A | | 6/1939 | Stacey | |
| 2,519,393 A | * | 8/1950 | Noyes | 244/135 B |
| 2,711,756 A | * | 6/1955 | Cottone et al. | 137/592 |
| 2,732,071 A | * | 1/1956 | Crow | 137/590 |
| 2,884,937 A | * | 5/1959 | Myers, Jr | 137/39 |
| 3,020,950 A | * | 2/1962 | Schraivogel | 137/549 |
| 3,084,472 A | * | 4/1963 | Feik | 43/55 |
| 3,180,084 A | * | 4/1965 | Meeks | 244/171.1 |
| 3,202,160 A | * | 8/1965 | Barger | 137/590 |
| 3,232,560 A | * | 2/1966 | Moise et al. | 244/159.3 |
| 3,234,728 A | * | 2/1966 | Christian et al. | 137/209 |
| 3,234,853 A | * | 2/1966 | Aber | 137/209 |
| 3,457,864 A | * | 7/1969 | Price | 137/209 |
| 3,744,738 A | * | 7/1973 | Howard | 244/172.2 |
| 3,782,416 A | * | 1/1974 | Levin | 137/590 |

(Continued)

FOREIGN PATENT DOCUMENTS

CA          683 854          4/1964

(Continued)

*Primary Examiner*—John Rivell
*Assistant Examiner*—Craig Price
(74) *Attorney, Agent, or Firm*—W. F. Fasse; W. G. Fasse

(57) ABSTRACT

A fuel tank of a spacecraft stores a liquid fuel and a pressurized propellant gas that drives the fuel out of the tank though a fuel extraction arrangement including a reservoir or fuel collection container and a tank outlet. A spiraling or J-shaped or hook-shaped fuel collection channel and plural obliquely sloping fuel flow channels connect the fuel collection container to an outlet pipe of the tank outlet. The channels are configured, dimensioned, oriented and arranged to ensure that fuel will be retained in the outlet pipe without leaking back into the fuel tank, even when the tank is oriented horizontally and has a low tank filling level. These structures produce a capillary pumping effect and use the surface tension to separate the fuel from the propellant gas, and allow the inner space of the collection container to be completely filled with liquid fuel.

19 Claims, 6 Drawing Sheets

U.S. PATENT DOCUMENTS

| | | | |
|---|---|---|---|
| 3,854,905 A | | 12/1974 | Balzer et al. |
| 3,933,448 A | * | 1/1976 | Di Peri .......................... 96/219 |
| 4,168,718 A | * | 9/1979 | Frosch et al. ............... 137/177 |
| 4,253,490 A | * | 3/1981 | Hansel ....................... 137/590 |
| 4,272,257 A | * | 6/1981 | Ellion et al. .................. 95/243 |
| 4,394,966 A | * | 7/1983 | Snyder et al. ............... 239/127 |
| 4,399,831 A | | 8/1983 | Robert |
| 4,489,745 A | | 12/1984 | Netter et al. |
| 4,709,723 A | * | 12/1987 | Sidaway et al. ............. 137/584 |
| 4,733,531 A | * | 3/1988 | Grove ......................... 137/590 |
| 4,743,278 A | | 5/1988 | Yeh |
| 4,768,541 A | * | 9/1988 | Uney et al. ................. 137/590 |
| 4,844,276 A | * | 7/1989 | Kunze et al. ............... 137/576 |
| 4,898,030 A | * | 2/1990 | Yeh ........................ 244/135 R |
| 4,901,762 A | * | 2/1990 | Miller, Jr. et al. ........... 137/590 |
| 4,976,398 A | * | 12/1990 | Bruhn ..................... 244/135 R |
| 5,071,093 A | * | 12/1991 | Perdu ..................... 244/135 R |
| 5,209,115 A | * | 5/1993 | Bond ...................... 244/135 R |
| 5,240,038 A | * | 8/1993 | Canedi ....................... 137/590 |
| 5,263,329 A | * | 11/1993 | Grove et al. ................. 137/590 |
| 5,279,323 A | * | 1/1994 | Grove et al. ................. 137/154 |
| 5,293,895 A | * | 3/1994 | Grove et al. ................. 137/154 |
| 5,441,219 A | * | 8/1995 | Rauscher, Jr. ........... 244/135 R |
| 5,901,557 A | * | 5/1999 | Grayson ..................... 62/45.1 |
| 6,003,534 A | * | 12/1999 | Gould et al. ................... 137/1 |
| 6,014,987 A | * | 1/2000 | List et al. .................... 137/549 |
| 6,298,868 B1 | * | 10/2001 | Dean et al. ............... 137/68.13 |
| 6,536,468 B1 | * | 3/2003 | Wilmer et al. ............. 137/544 |
| 6,745,983 B2 | * | 6/2004 | Taylor .................... 244/135 R |
| 7,395,832 B2 | * | 7/2008 | Behruzi et al. .............. 137/154 |
| 2007/0084509 A1 | | 4/2007 | Behruzi et al. |

FOREIGN PATENT DOCUMENTS

| | | |
|---|---|---|
| DE | 31 46 262 | 5/1983 |
| DE | 37 50 727 | 6/1995 |
| DE | 100 40 755 | 3/2002 |
| DE | 101 17 557 | 10/2002 |
| EP | 0 367 001 | 5/1990 |

\* cited by examiner

FUEL TANK WITH SPECIALIZED TANK OUTLET FOR SPACECRAFT

PRIORITY CLAIM

This application is based on and claims the priority under 35 U.S.C. §119 of German Patent Application 10 2005 062 092.2, filed on Dec. 22, 2005, the entire disclosure of which is incorporated herein by reference.

FIELD OF THE INVENTION

The invention relates to a fuel tank, and especially such a tank for storing aggressive liquid fuels for operation of spacecraft.

BACKGROUND INFORMATION

Spacecraft such as rockets, shuttles, satellites, orbital stations, and other bodies flying in space are typically outfitted with suitable containers or fuel tanks for storing liquid fuels that are used to power the engines, including engines or thrusters for carrying out apogee maneuvers as well as position regulation in space. In order to drive or propel the liquid fuel out of the fuel tank, the fuel tank is typically also charged with a pressurizing or propellant gas, which serves to pressurize the fuel and drive the fuel to the combustion or reaction chambers of the engines. Inert gases such as helium (He) or nitrogen ($N_2$) are typically used as the propellant gases, which are introduced under pressure into the fuel tank, and which thus serve to press the liquid fuel from the fuel tank into the piping system leading to the respective engine. The liquid fuel may be an aggressive storable liquid fuel such as MMH, $N_2O_4$, or hydrazine.

With such gas-charged fuel tanks, it is very important to achieve a complete, sure and reliable separation between the propellant gas serving as a conveying medium, and the liquid fuel that is conveyed or delivered to the engine. Namely, when the liquid fuel is delivered to the engine, it is crucial that the liquid fuel must be free of foreign gas inclusions or bubbles at the time of ignition of the fuel. Otherwise, the ignition of the fuel, and the reliable operation of the engine, could be jeopardized.

A fuel tank of the above described general type and operating according to the above described principle is known from the German Patent 100 40 755. Moreover, U.S. Pat. No. 5,293,895 discloses a fuel tank for use in space, whereby the outlet of the tank includes an arrangement of an outlet pipe connected with a reservoir or collection container via a plurality of bored holes.

A standard known method of separating liquids and gases from one another involves the use of screens or sieves, which block the throughflow of gases up to a certain pressure difference across the screen or sieve. Separating devices using such sieves, however, are relatively expensive and complicated. In small satellites with relatively low fuel volume delivery flows, it is possible to avoid the use of such relatively expensive sieves under certain circumstances. Namely, it is desirable to reduce the cost and complexity of the fuel separating arrangements if possible.

A special and often called-for requirement of such tanks is additionally the possibility of transporting the already-filled fuel tank in a horizontal orientation, with the tank integrated in a satellite, as the satellite is transported to the launch location. This is especially significant when limitations on the degree of tank filling are to be avoided. Due to dynamic effects, the forces arising during the transport can amount to or exceed a multiple of the forces arising due to normal earth's gravity. In the previously known tanks of this type, it has therefore either been necessary to limit the degree of tank filling in the direction of smaller or partial filling, so that the tank outlet would always be covered or surrounded with liquid, or been necessary to bound the tank outlet by a very narrow or tight channel, which, however, produces relatively high pressure losses when the fuel is withdrawn from the tank during operation. The maximum permissible pressure losses that can occur in that regard are typically prescribed.

A further requirement is the possibility that a satellite equipped with such a tank can be launched into orbit in an orientation perpendicular to the tank outlet. This possibility is especially pertinent for the transport of several small satellites that are arranged laterally horizontally on a central carrier structure. The high dynamic loads that arise during a rocket launch cause any exposed sieves or openings typically to loose their holding or retaining ability, that is to say an entry or penetration of the propellant gas into the outlet cannot be prevented. This leads to a failure if the fuel tank is not completely filled and sensitive components such as sieves and openings protrude out of the liquid. In that case, the propellant gas can penetrate through the sieves and openings to the tank outlet under high load conditions, which similarly lead to a failure of the engine. Therefore, with previously known tanks of the above described type, it has not been possible to carry out a rocket launch with a horizontally oriented tank.

Furthermore, fuel tanks are known from the published European Patent Publication EP 0 367 001 B1 and the German Patent Publication DE 37 50 727 T2, whereby a fuel extraction arrangement is arranged on a floor or bottom of the fuel tank, and wherein a separation of the fuel and the pressurizing propellant gas is achieved through use of the surface tension respectively by means of each fuel collection container and each associated tank outlet. In these known fuel tank outlet arrangements, there is a significant deficiency or disadvantage in that it cannot be ensured that a consistent supply of fuel will be available at the outlet openings, in order to prevent the flow of the pressurizing propellant gas into the outlet openings, with low fuel filling levels in the tank, and with a horizontal orientation of the tank with various rotation angles thereof during transport and/or launch of the space vehicle in which the tank is installed.

SUMMARY OF THE INVENTION

In view of the above, it is an object of the invention to provide a fuel tank for a spacecraft using surface tension of the fuel to achieve a separation of the fuel from a pressurizing propellent gas, using a refillable reservoir or collection container arranged at a nominal bottom of the fuel tank. The invention aims to further develop such a fuel tank, so that the fuel will be stably held in the fuel line to prevent the formation of bubbles in the fuel being supplied through the tank outlet. It is thus a further object of the invention that a spacecraft equipped with the fuel tank can be launched even with the fuel tank oriented horizontally, in various rotational positions of the tank, and simultaneously with a low liquid fuel filling level. This is especially applicable to a satellite fuel tank. A further object of the invention is to enable the fuel tank to be transported in its horizontal orientation, without limitations with respect to its orientation, rotational position or liquid fuel filling level. A further related object is to ensure that a spacecraft equipped with such a fuel tank can be operated in orbit directly following such a launch, while ensuring the bubble-free supply of the fuel from the tank through the tank outlet to the spacecraft engine or engines, despite the preceding horizontal orientation of the tank during transport and/or launch of the spacecraft. The invention further aims to avoid or overcome the disadvantages of the prior art, and to achieve additional advantages, as apparent from the present specification. The attainment of these objects is, however, not a required limitation of the claimed invention.

The above objects have been achieved according to the invention in a fuel tank for a spacecraft, of the general type discussed above, wherein the fuel extraction arrangement includes a fuel collecting or collection container and a tank outlet with an outlet pipe, as well as a snail-shaped or spiral-shaped or J-shaped or hook-shaped fuel collection channel and fuel flow channels, that connect the fuel collection container to the tank outlet pipe. The components of the inventive arrangement, and especially the fuel collection channel and the fuel flow channels leading from the collection container into the outlet pipe, are configured, oriented and arranged relative to each other and relative to the axis of the tank, to ensure that at least a minimum retained quantity of fuel is always held or retained at the outlet holes so that no gas will penetrate into the outlet holes, even for a low fuel filling level in the tank, and even when the tank is oriented horizontally at various rotation positions about its longitudinal axis, during transport and/or launch of the spacecraft in which the fuel tank is installed.

Thereby, no gas can penetrate into the outlet openings, so that no gas bubbles arise in the fuel outlet pipe. This is especially ensured by the labyrinth-like configuration of the interior of the fuel outlet arrangement according to the invention. A bubble-free supply of the fuel from the tank during the following orbital operation of the spacecraft is ensured, in that the interior of the fuel outlet is constantly completely filled with fuel through the effect of capillary forces under weightless conditions within a very short time, for example within a few seconds, after the launch phase. In other words, the fuel outlet arrangement is quickly filled and refilled as applicable in a very short time, without giving rise to gas bubbles in the fuel outlet. After this filling process, the fuel tank is ready for operation, i.e. ready for supplying fuel without any gas bubbles in the fuel line.

The manufacturing costs for the fuel tank according to the invention are practically not increased in comparison to the conventional tank construction. Thus, while the costs remain the same, the inventive arrangement achieves a considerable increase of the flexibility with respect to the handling of the fuel tank while on the ground and during the rocket launch. Namely, a greater flexibility as to the orientation of the tank and as to the degree or level of filling of the tank is achieved. With such a construction, the fuel tank according to the invention can achieve a secure, reliable, bubble-free supply of liquid fuel without using any sieves for separating the fuel from the propellant gas.

BRIEF DESCRIPTION OF THE DRAWINGS

In order that the invention may be clearly understood, it will now be described in connection with an example embodiment, with reference to the accompanying drawings, wherein.

DETAILED DESCRIPTION OF A PREFERRED EXAMPLE EMBODIMENT AND OF THE BEST MODE OF THE INVENTION

Figure 1:
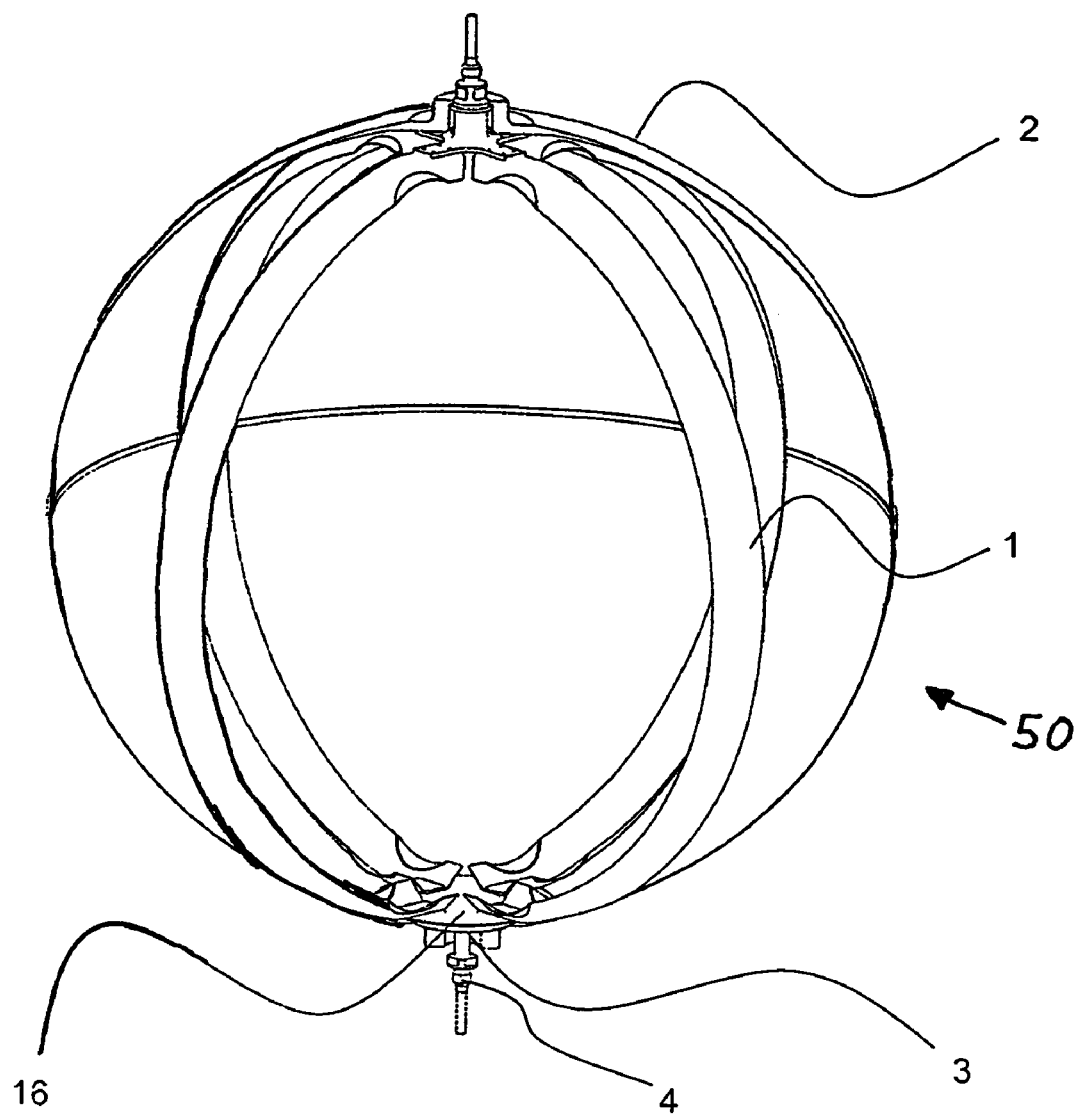
FIG. 1 is a cut-away perspective view of a fuel tank according to an example embodiment of the invention.

FIG. 1 generally shows a substantially spherical fuel tank 50 for a spacecraft, whereby this fuel tank 50 is particularly a so-called surface tension tank for receiving, containing and storing an aggressive storable liquid fuel, such as MMH, $N_2O_4$ or hydrazine. In this application, the term fuel can also or alternatively include an oxidizer. The tank is at least partially filled with such a liquid fuel (not shown in FIG. 1) and further contains a pressurized propellant gas, which may typically be an inert gas such as helium (He) or nitrogen ($N_2$) which is also not shown in FIG. 1. The pressurized propellant gas serves to pressurize and drive the liquid fuel out of the tank to an engine such as a main rocket engine or a thruster engine of a spacecraft through a piping system (not shown).

The tank 50 is bounded by a substantially spherical tank wall 2. In order to extract or withdraw the fuel out of the tank 50, the tank is equipped with a fuel extraction arrangement that makes use of the surface tension of the fuel to separate the fuel from the propellant gas, as described further herein. Four guide vanes or guide plates 1 are arranged along the tank wall 2 for collecting and guiding the fuel, especially under weightless conditions. These guide plates or vanes 1 lead into a reservoir or fuel collection container 3 arranged at a nominal bottom of the fuel tank 50. The fuel collection container 3 is covered by a cover plate 16. The fuel collection container 3 at the floor or bottom of the fuel tank 50 is connected and leads to a tank outlet 4 through which the fuel exits the tank to the piping system that leads to the combustion or reaction chamber of the engine (not shown).

It should be understood that the nominal "bottom" of the fuel tank 50 only pertains to a particular "upright" orientation of the tank while it is on the earth or at least under a gravitational or other acceleration influence that would define a "top" and a "bottom" of the tank and other components in this orientation. The "bottom" could alternatively be oriented laterally toward the side (as will be discussed below in connection with FIGS. 4 to 8), or could have no defined positional meaning in a weightless's environment.

Figure 2:
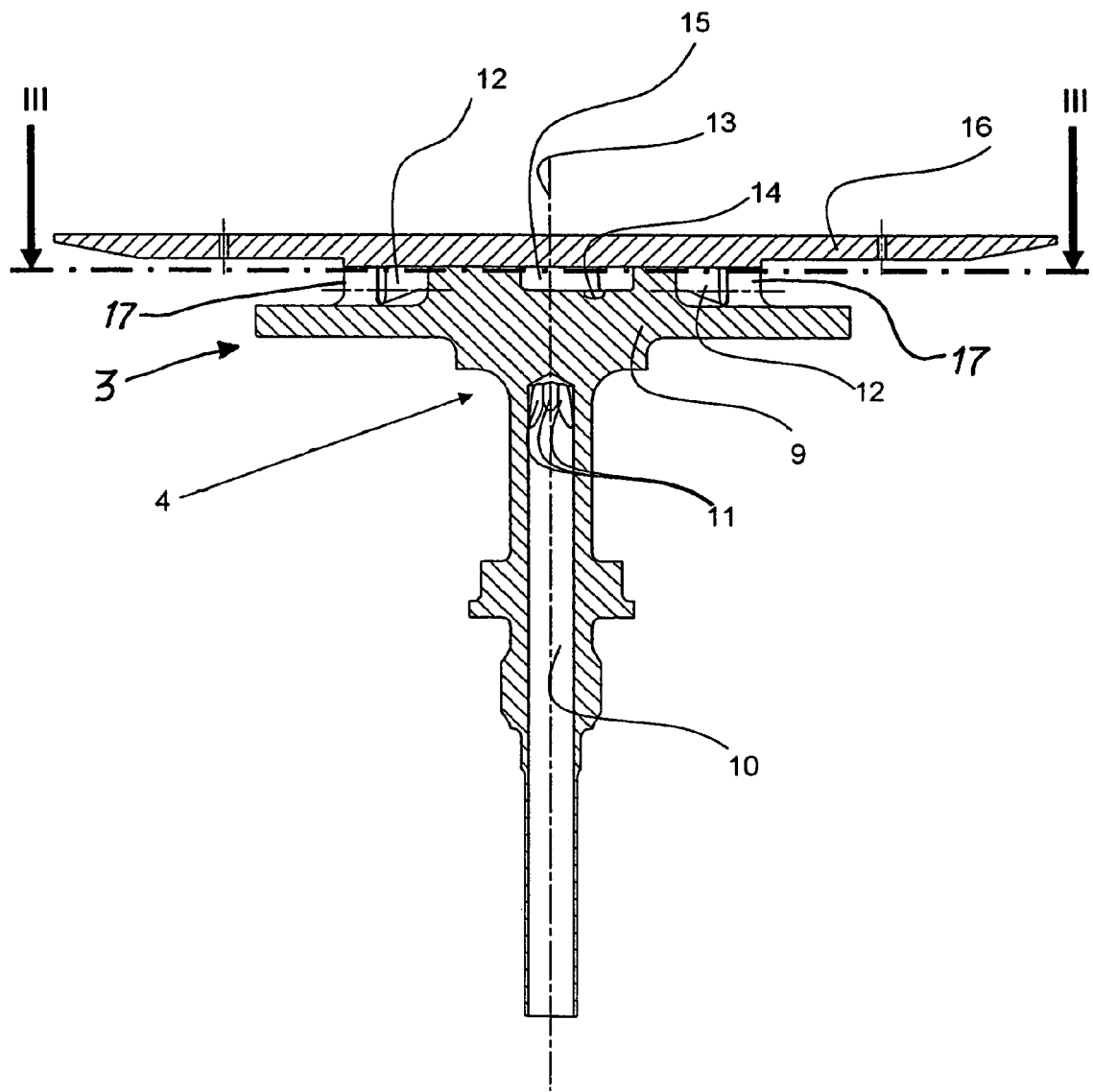
FIG. 2 is a sectional detail view of the tank outlet arrangement of the fuel tank according to FIG. 1.
Figure 3:
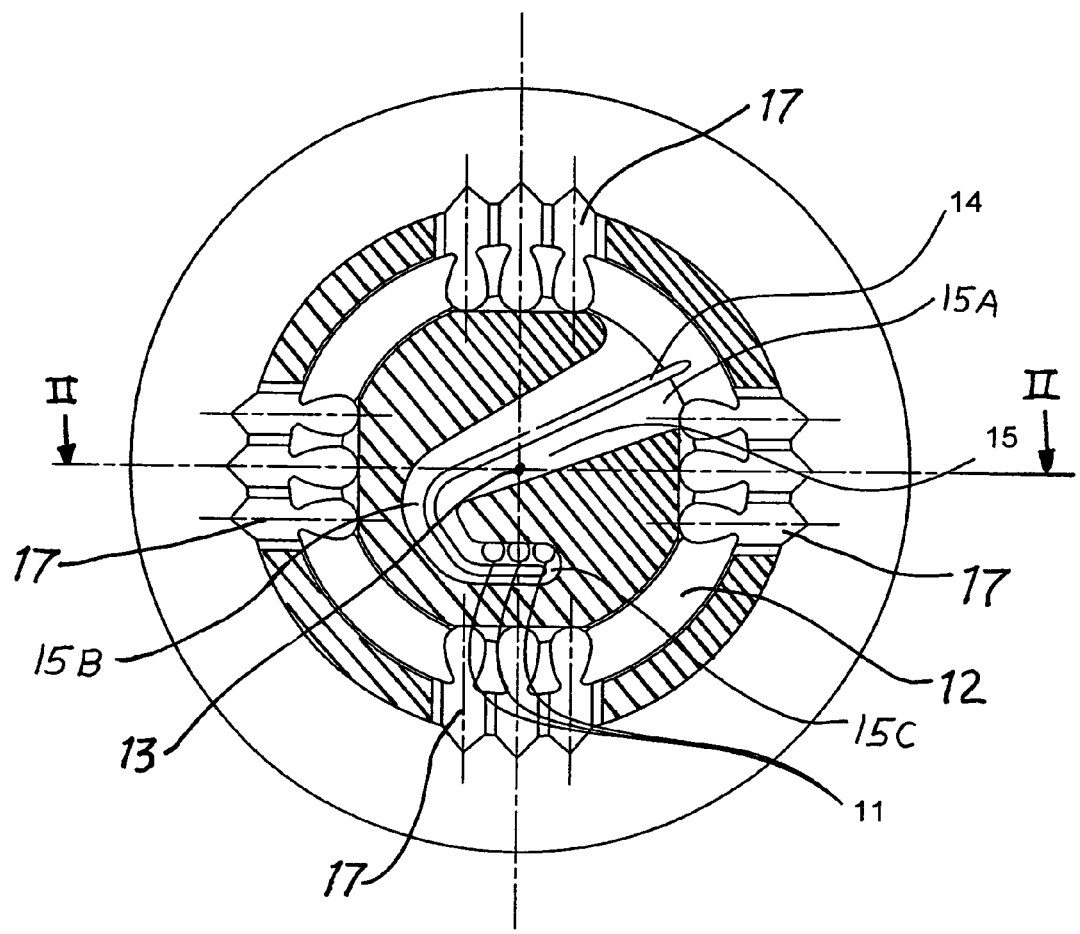
FIG. 3 is a sectional view along the section line III-III in FIG. 2, and shows a section line II-II indicating the sectional view of FIG. 2.

FIGS. 2 and 3 show the fuel reservoir or collection container 3 in detail. FIG. 2 is a longitudinal sectional view taken along the longitudinal axis 13 of the fuel tank 50 and of the fuel extraction arrangement. FIG. 3 is a sectional view of the fuel extraction arrangement taken on a plane normal to the longitudinal axis 13, as shown by the section line III-III in FIG. 2.

As can be seen especially in FIG. 2, in the present example embodiment, the bottom part 9 of the fuel collection container 3 forming the tank outlet 4 is embodied as a rotationally turned or milled part, whereby especially the manufacturing costs can be held low. Preferably, the bottom part is an integral one-piece component with an outlet pipe or stub 10 leading to the spacecraft piping system. The fuel collection container 3 further includes a top part or cover plate 16 in the manner of a generally disk-shaped plate that is spaced apart from or arranged on the uppermost surface of the bottom part 9, to bound a fuel reservoir or interior space 12 therebetween. The interior space 12 is especially embodied as a ring-shaped or annular channel 12 (see FIG. 3). Fuel feed passages 17 extend generally radially between the cover plate 16 and the bottom part 9 to allow fuel from the tank interior space of the fuel tank 50 to enter into the fuel reservoir or interior space formed by the annular channel 12 of the fuel collection container 3. Particularly, as can be seen in FIGS. 2 and 3, the fuel feed passages 17 are milled through an annular wall portion of the remaining material of the bottom part 9. In the illustrated example embodiment, there are four groups of three fuel feed passages 17, spaced at 90° rotational offsets from one another about the axis 13. This total of twelve fuel feed passages 17 enables a high fuel feed rate without a great pressure loss, and allows fuel to feed from the tank 50 into the annular channel 12 at various different rotational positions of the tank 50 about the longitudinal axis 13, when this axis 13 is oriented horizontally (see FIGS. 4 to 8 as discussed below).

As can be seen especially in FIG. 3 in connection with FIG. 2, the fuel extraction arrangement further has a snail-shaped or spiraling or J-shaped or hook-shaped fuel collection channel 15 that extends and spirals from the annular channel 12 generally inwardly in a spiraling or hooking pattern around the longitudinal axis 13 at the center of the bottom part 9 of the fuel collection container 3, as seen on the plane (III-III) perpendicular to the longitudinal axis 13. The fuel extraction arrangement still further has a plurality of opening or connection or fuel flow channels 11 that communicate from an inner end of the spiraling fuel collection channel 15 into the centrally arranged outlet pipe 10. The outlet pipe 10 extends axially along the longitudinal axis 13 and is preferably formed as one integral component, and particularly a rotationally turned component, together with the bottom part 9 of the fuel collection container 3 as mentioned above.

In the particular illustrated example embodiment, there are three fuel flow channels 11 extending from the inner end of the spiraling fuel collection channel 15 into the outlet pipe 10. The fuel flow channels 11 each have a diameter of approximately 2 mm in a preferred example embodiment. The fuel flow channels or connection channels 11 extend obliquely or slopingly at an acute angle relative to the longitudinal axis 13, from the inner end of the spiraling fuel collection channel 15 into the fuel outlet pipe 10. The fuel collection channel 15 preferably may have a J-shape or hook-shape as illustrated, with a straight-extending outer leg 15A, a straight-extending inner leg 15C, and a curved or angled hook portion 15B connecting the inner and outer legs 15C and 15A. The angle between the inner and outer legs 15C and 15A may preferably be 15° to 40° or e.g. 25°+5°. The fuel collection channel 15 preferably spirals around the axis 13 by about three-quarters of a rotation, e.g. about 260° to 290°, or about 280°+5° around axis 13. This ensures that the tank outlet arrangement will retain fuel and prevent bubble formation in the outlet pipe 10 for all rotation angles of the tank 50 around the axis 13 when the axis is oriented horizontally. These angular ranges are preferred for achieving this result, but other angles or arrangements may be suitably determined for any given case.

Thus, with this arrangement, a fuel communication is established from the interior of the fuel tank 50 into the fuel outlet pipe 10, successively from the interior of the fuel tank 50 through the fuel feed passages 17 into the annular channel 12 forming the interior space of the fuel collection container 3, from the annular channel 12 through the spiraling fuel collection channel 15 into the fuel flow channels 11, and from the fuel flow channels 11 into the fuel outlet pipe 10. The size, configuration, orientation, positions and arrangement of the fuel feed passage 17, the annular channel 12, the spiraling fuel collection channel 15, and the obliquely sloping fuel flow channels 11, in absolute terms and relative to one another, are embodied in such a manner to ensure that fuel is retained in the fuel outlet pipe 10, the fuel flow channels 11, and preferably at least a portion of the fuel collection channel 15, as will be described further below especially in connection with FIGS. 4 to 8. Also, the orientation, configuration, dimensions, and arrangement of the several identified components, and especially the sloping arrangement of the fuel flow channels 11, are embodied so that no propellant gas bubbles will be trapped in the fuel outlet pipe 10, the fuel flow channels 11, the fuel collection channel 15, or the annular channel 12, during the first filling of the tank 50 with fuel 5, as the fuel flows into these components.

The interior space formed by the annular channel 12 of the reservoir or fuel collection container 3 can be filled and re-filled by itself in a complete and bubble-free manner with liquid fuel both during the upright tipping or rotation of the tank from the horizontal orientation into the vertical orientation, for example following a horizontal transport of the tank with a low tank filling level, as well as in a weightless condition. This filling of the interior space or annular chamber 12 is achieved due to the capillary effects and due to the special geometry of the fuel-communicating components as described herein. Also, an additional groove 14 is preferably provided centrally along the wall of the spiraling fuel collection channel 15 in the bottom part 9 of the fuel collection container 3. The filling of the snail-shaped or spiraling or J-shaped or hook-shaped fuel collection channel 15 is supported or assisted by the above mentioned central groove 14 in the channel 15. Moreover, the channel 15 preferably tapers narrower toward its inner end, i.e. becomes wider outwardly toward its outer end adjoining the annular channel 12, so that any gas bubbles will be driven out in the direction toward the annular channel 12.

Figure 4:
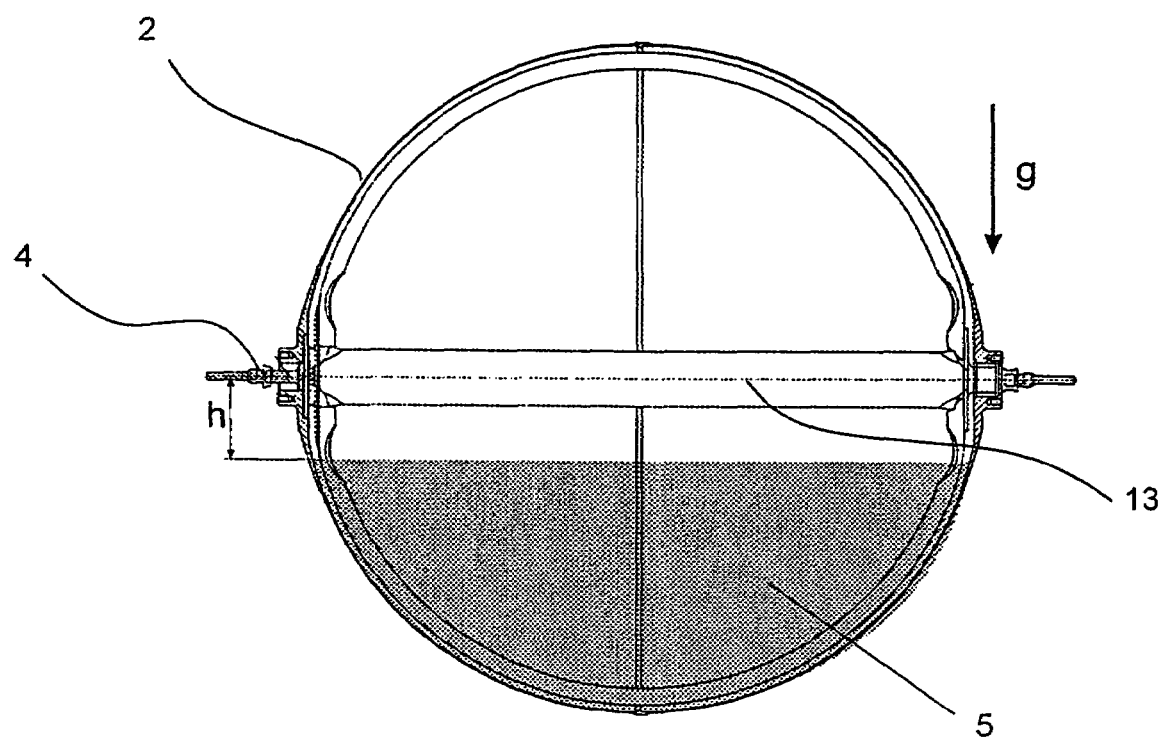
FIG. 4 is a vertical sectional view in the area of the longitudinal axis through the fuel tank according to FIG. 1, which is shown here oriented horizontally in position for a launch.

Filling of the tank 50 with fuel 5 is usually carried out with the tank oriented vertically, i.e. with the longitudinal axis 13 extending parallel to the direction of earth's gravitational field. In this orientation, the entire tank outlet 4 as well as the fuel collection container 3 are completely covered by and filled with liquid fuel 5. If the tank 50 is subsequently tilted about the tank's crosswise axis, so that the tank comes into the horizontal position (i.e. with the longitudinal axis 13 oriented horizontally) as shown in FIG. 4, then the outlet 4 of the filled tank 50 will be oriented perpendicularly to the direction of earth's gravitational acceleration illustrated by the arrow g in FIG. 4. In this position, the fuel 5 no longer covers and wets the tank outlet 4, especially if there is a relatively low fuel filling level (less than half full). Instead, the fuel level is at a spacing distance h below the outlet 4. In this situation, the snail-shaped or spiraling or J-shaped or hook-shaped fuel collection channel 15 and the obliquely sloping fuel flow channels 11 ensure that the liquid fuel is retained in the tank outlet arrangement and especially cannot flow out of the outlet pipe 10 backwards back into the interior space of the fuel tank 50. Thus, when this horizontal orientation of the tank arises, and the situation shown in FIG. 4 pertains (for example during horizontally oriented transportation, or even with a horizontal orientation of the tank during launch of the spacecraft in which the tank is installed), the fuel will be effectively retained in the outlet arrangement, and the penetration of gas into the fuel outlet pipe 10 will be prevented. Further details of this feature are explained next in connection with FIGS. 5 to 8.

FIG. 5 to 8 show sectional views of the bottom part 9 of the fuel collection container 3, similar to FIG. 3, but especially showing an amount of retained fuel 5A in the fuel collection channel 15 and the fuel flow channels 11 for four different rotational orientations of the fuel outlet or fuel extraction arrangement about the longitudinal axis 13. The arrow a indicates an acceleration field, such as earth's gravitational acceleration, or an acceleration arising due to a rocket launch, such that the retained fuel 5A is held or pushed into the fuel collection channel) 15 and the fuel flow channels 11 in all rotational positions of the arrangement, as follows.

Figure 5:
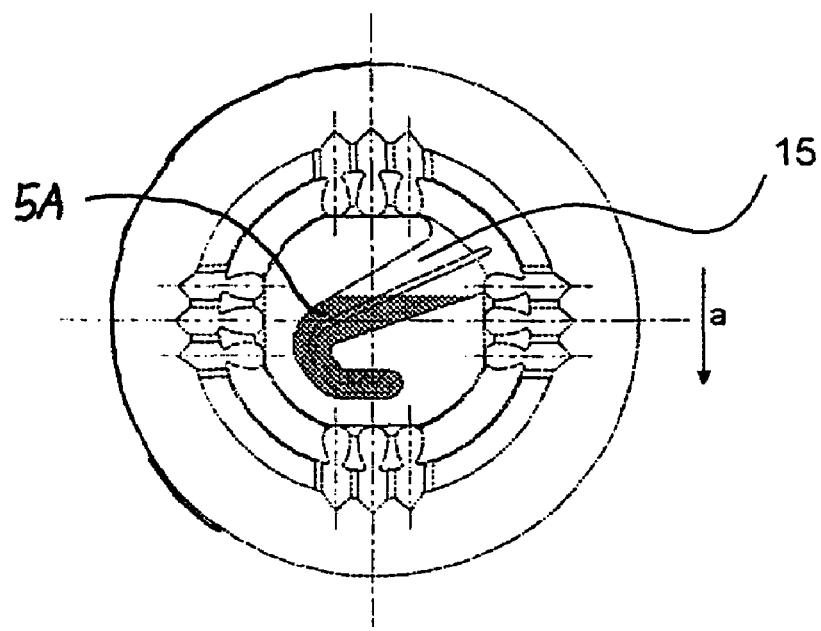
FIG. 5 is a sectional view similar to FIG. 3, showing an amount of retained fuel in the tank outlet arrangement in a first rotational orientation about the longitudinal axis of the tank oriented horizontally as shown in FIG. 4.

In FIG. 5, the tank is rotationally oriented about its horizontally extending longitudinal axis 13 so that the tapered inner end of the spiraling or hook-shaped fuel collection channel 15 is located downwardly in the acceleration field a. Thus, the retained fuel 5A in the outlet pipe 10, the fuel flow channels 11, and in the bottom or inner portion of the fuel collection channel 15 cannot spill out, but instead is retained in these communicating components.

Figure 6:
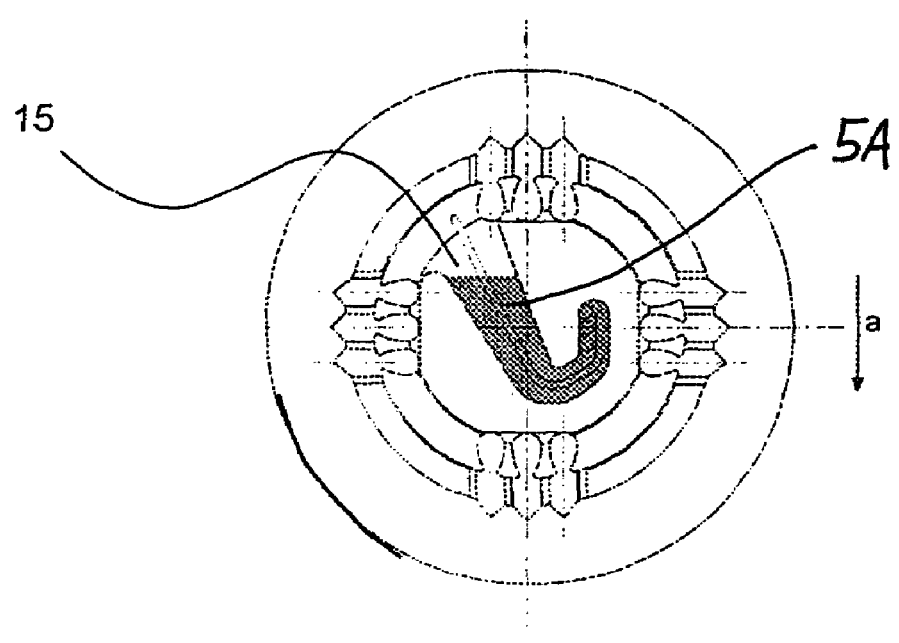
FIG. 6 is a view similar to that of FIG. 5, but showing the retained fuel in a different rotational orientation rotated 90° counterclockwise relative to FIG. 5.

In FIG. 6, the fuel tank has been rotated 90° farther counterclockwise relative to FIG. 5. Once again, the retained fuel 5A cannot spill out under the influence of the acceleration field a, but instead is retained in the hook-shaped or spiraling fuel collection channel 15 and thus also in the fuel flow channels 11 and the communicating outlet pipe 10.

Figure 7:
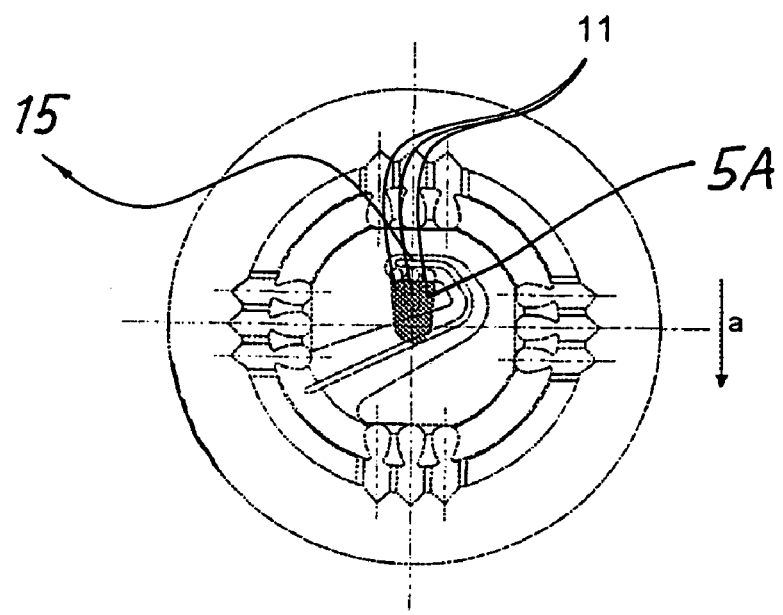
FIG. 7 is a further view similar to FIGS. 5 and 6, but showing the retained fuel especially in fuel flow channels in a different rotational orientation, rotated 90° counterclockwise relative to FIG. 6.
Figure 8:
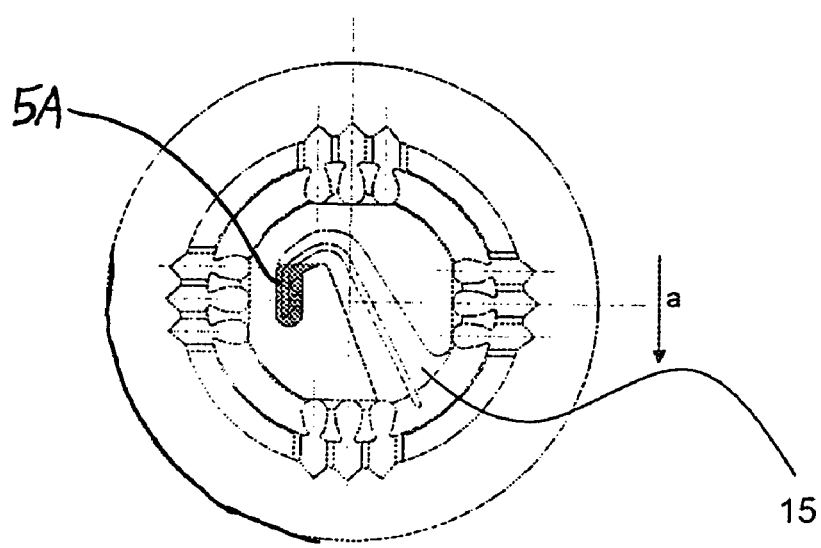
FIG. 8 is a another view similar to FIGS. 5 to 7, but showing the retained fuel in the tank outlet arrangement in a rotational orientation rotated 90° counterclockwise relative to FIG. 7.

In FIG. 7, the tank has been rotated again 90° farther counterclockwise relative to FIG. 6. In this rotational orientation, fuel has spilled out of the spiraling or hook-shaped fuel collection channel 15. However, the obliquely sloping arrangement of the fuel flow channels 11 extending from the inner end of the fuel collection channel 15 into the fuel outlet pipe 10 still retains an amount of retained fuel 5A, which cannot flow "uphill" out of the fuel flow channels 11 against the influence of the acceleration field a.

In the rotational orientation of FIG. 8, the tank has once again been rotated 90° farther counterclockwise relative to FIG. 7. In this orientation, the innermost end portion of the spiraling or hook-shaped fuel collection channel 15 retains an amount of retained fuel 5A that cannot spill out. Thus, fuel is also retained in the fuel flow channels 11 and the outlet pipe 10.

Thus, as can be seen in FIGS. 5 to 8, the combined effect of the special configurations and arrangements of the channels 11 and 15 ensure that the outlet pipe 10 is not emptied, i.e. that fuel is always retained in the outlet pipe 10 and cannot flow back into the tank, in all cases, i.e. in all rotational orientations of the tank. It is therefore possible to tip the tank out of the vertical into the horizontal position in all directions and with all rotational orientations about the longitudinal axis 13 of the tank.

The use of several connection or fuel flow channels 11 as described above in the tank outlet 4 additionally achieves a significantly reduced pressure loss at the tank outlet 4 during the extraction or expulsion of fuel from the tank, in comparison to the previously known tanks and tank outlet arrangements described above. In addition to the expanded field of application with respect to a horizontal orientation of the tank during transport and launch, the inventive structure of the tank outlet arrangement further provides a larger reserve with respect to the maximum tolerable pressure losses, as well as a fast filling and emptying of the tank on the ground.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A fuel tank for a spacecraft, for storing a liquid fuel and a pressurized propellant gas, said fuel tank comprising:
   a tank wall enclosing a tank interior space adapted to store the liquid fuel and the propellant gas therein; and
   a fuel extraction arrangement that communicates out of said tank interior space through said tank wall, and that comprises a fuel collection container and an outlet pipe;
   wherein:
   said fuel collection container includes a fuel collection container body that defines therein a fuel reservoir space communicating with said tank interior space through fuel feed passages;
   said outlet pipe extends from said fuel collection container outwardly away from said tank interior space; and
   said fuel collection container body has therein a hook-shaped fuel collection channel that communicates with said fuel reservoir space, and plural fuel flow channels that communicate from said fuel collection channel into said outlet pipe, wherein said fuel collection channel has a hook shape on a plane perpendicular to a longitudinal axis of said outlet pipe, wherein said hook shape hooks around or passes through said longitudinal axis in said plane, and wherein said hook shape includes a straight-extending outer leg, a straight-extending inner leg, and a curved or angled hook portion extending between and connecting said outer leg and said inner leg.

2. The fuel tank according to claim 1, wherein said fuel collection container including said fuel collection channel, said fuel flow channels and said fuel reservoir space are configured, dimensioned and arranged to achieve a separation of the liquid fuel from the propellant gas due to a surface tension of the liquid fuel.

3. The fuel tank according to claim 1, wherein said fuel flow channels and said fuel feed passages are respective bored holes.

4. The fuel tank according to claim 1, wherein said fuel collection container body and said outlet pipe are monolithically integral with one another as a unitary one-piece component.

5. The fuel tank according to claim 1, wherein said fuel collection container excludes any sieve and excludes any screen.

6. The fuel tank according to claim 1, wherein said fuel collection channel tapers relatively narrower toward an inner end thereof adjoining said fuel flow channels and flares relatively wider toward an outer end thereof adjoining said fuel reservoir space.

7. The fuel tank according to claim 1, wherein said fuel collection container body further has a groove therein running along and open to said fuel collection channel.

8. The fuel tank according to claim 1, wherein said inner leg and said outer leg extend at an angle relative to one another, with said angle being in a range from 15° to 40° between said inner leg and said outer leg.

9. The fuel tank according to claim 1, wherein said hook shape of said fuel collection channel extends over an angular portion of said fuel collection container body in a range from 260° to 290° around said longitudinal axis.

10. The fuel tank according to claim 1, wherein said fuel reservoir space comprises an annular channel in said fuel collection container body.

11. The fuel tank according to claim 1, wherein said fuel feed passages are arranged in plural groups of plural adjacent fuel feed passages respectively.

12. The fuel tank according to claim 11, wherein there are four of said groups of fuel feed passages, and said groups are located at 90° angular offsets from one another around a central longitudinal axis of said outlet pipe.

13. The fuel tank according to claim 11, wherein an outer end of said fuel collection channel opens into said fuel reservoir space at an angular position between adjacent ones of said groups of fuel feed passages.

14. The fuel tank according to claim 1, wherein said fuel flow channels slope obliquely at an acute angle relative to a central longitudinal axis of said outlet pipe as said fuel flow channels extend from said fuel collection channel to said outlet pipe.

15. The fuel tank according to claim 1, wherein said fuel flow channels each respectively have a diameter of about 2 mm.

16. The fuel tank according to claim 1, wherein said fuel collection container further includes a disk-shaped cover plate arranged with said fuel reservoir space and said fuel feed passages bounded between said cover plate and said fuel collection container body.

17. The fuel tank according to claim 1, in combination with and containing an amount of said liquid fuel that corresponds to less than half of a volume of said tank interior space and that fills said tank interior space to a certain fill level, and in combination with and containing an amount of said propellant gas in said tank interior space above said certain fill level, wherein said fuel tank is arranged in a gravitational environment and is oriented in a horizontal orientation with a longitudinal axis of said outlet pipe extending horizontally, and wherein said certain fill level of said liquid fuel in said tank interior space is below and spaced away from said outlet pipe and said fuel collection container such that said fuel collection container is exposed to said propellant gas.

18. The fuel tank according to claim 17, wherein a retained amount of said liquid fuel is retained in and fills said outlet pipe, said fuel flow channels, and optionally at least a portion of said fuel collection channel, without flowing out of said fuel extraction arrangement back into said tank interior space.

19. The fuel tank according to claim 18, wherein none of said propellant gas penetrates into said fuel flow channels and said outlet pipe despite said horizontal orientation of said fuel tank.

* * * * *